Oct. 14, 1952  J. J. TALLMAN  2,613,824
STACKING APPARATUS

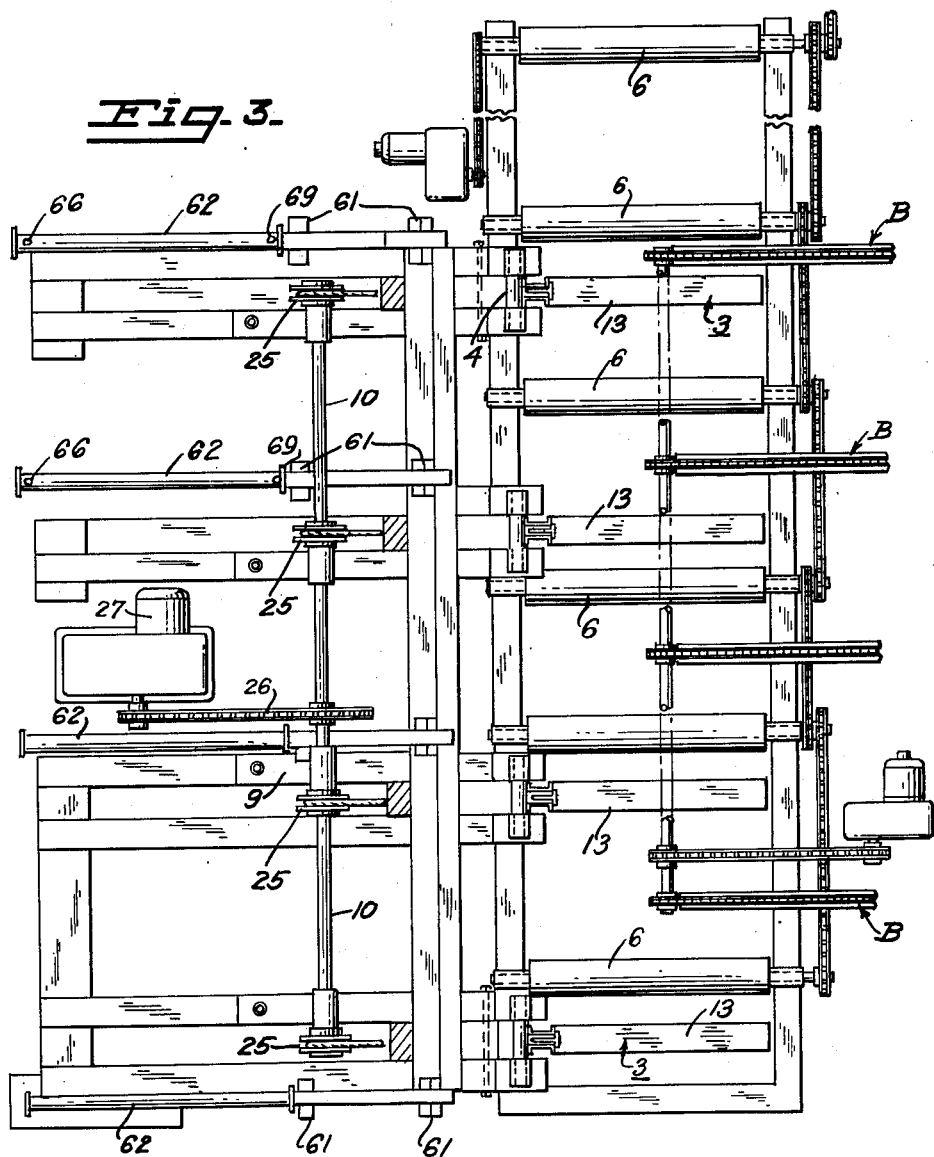

Filed April 26, 1947  3 Sheets-Sheet 3

INVENTOR.
JESSE J. TALLMAN
BY
Stephen S. Townsend
ATTORNEY

Patented Oct. 14, 1952

2,613,824

UNITED STATES PATENT OFFICE 2,613,824

STACKING APPARATUS

Jesse J. Tallman, Fort Bragg, Calif.

Application April 26, 1947, Serial No. 744,195

8 Claims. (Cl. 214—6)

This invention relates to reloading apparatus and, more particularly, to tiltable lumber reloader apparatus of the character adapted to be utilized in lumber mills, or the like.

It is common practice in a lumber mill to produce a number of sizes and types of timbers from each log. The sizes and types of timbers and boards may vary according to market demand or other variable factors. Similarly, it is obviously economical to produce certain sized boards in order to obtain the maximum usable lumber from a particular log or logs. The various sizes of boards or timbers require different treatments as, for example, rough, finished and moldings. Varying types of planing machines, shapers and other equipment may be used to produce a variety of board sizes desirable from a given log. Consequently, it is incumbent upon the lumber mills to adopt a flexible system for transporting, unloading and reloading the unfinished and semifinished stock from machine to machine within the mill.

Conveyor systems of various types may be utilized, such as conveyor belts and chains, driven rollers and gravity chutes, together with automotive carriers, to deliver a load from the output end of one machine to a conveyor loading station for transport to another machine adapted to perform a further step in the fabrication of a particular lumber product.

According to conventional practice in lumber mills, lumber is usually manually piled in unit packages at a reloading point of transfer in readiness for movement to the next manufacturing operation or for shipping. Automatic reloaders of the character of the present invention may be provided at points of transfer within a lumber mill in order to obviate the necessity for manual labor and its attendant expense and danger. Heretofore known reloaders embody means whereby a lumber load is lowered vertically as each layer is placed thereupon, so that each board must be manually individually handled by the attendant and which, obviously, requires considerable physical effort and also results in damage to the lumber because of rough or negligent handling.

It is an object of the present invention to provide an improved lumber reloader, in which the loading and stacking of lumber from a conveyor belt or the like are combined in one tiltable, vertically movable mechanism.

A further object of the invention is to provide a simplified reloader mechanism of the character mentioned wherein the tilting of the mechanism and the lowering of the load supports are performed as a continuing operation and which requires no attention by the operator in making the transition from the tilting or loading position of the mechanism to the lowering thereof.

It is a specific object of the present invention to provide a lumber reloader wherein an operator may guide lumber thereupon with a minimum of effort, being aided by gravity, and which may be lowered by said operator by appropriate control means until a complete load is deposited thereupon and wherein automatic means is provided to cut off the raising and lowering of the load-carrying members beyond predetermined points.

It is a further object of the present invention to provide a lumber reloader of the character mentioned by providing a plurality of tiltable guide members upon which traverse lifting and lowering members and wherein the tiltable guide members serve to maintain automatically a load of lumber carried upon the lifting and lowering members in alignment.

It is a further object of the present invention to provide a lumber reloader of the character mentioned which is provided with safety means in order to minimize the danger of damage to the load being handled and to prevent injury to the operator thereof.

It is a further object of the present invention to provide means whereby a suitably balanced pile of lumber may be formed which may be transported as a stable unit.

Further objects and advantages of the present invention will become obvious upon reference to the accompanying specification and drawings in which similar characters of reference represent corresponding parts in the several views.

In the drawings:

Fig. 3 is a top plan view of the reloader assembly with the operator's platform removed.

The invention comprises, essentially, a plurality of aligned guide columns, spaced apart and adapted to be tilted vertically about a common axis. Each of said tiltable guide columns carries a hoisting arm which is traversible along a said guide column at a fixed angle of 90° relative thereto and wherein the hoisting arms travel in unison along said guide columns and said guide columns are tilted in unison.

In operation, the guide columns are tilted and the hoisting arms are elevated to receive lumber from a conveyor belt, or the like. As each succeeding layer of lumber is delivered to the hoisting arms the said arms are lowered in unison by an operator. When the arms and load carried thereby reach a predetermined point, the guide column tilts to vertical position and the hoisting arms are thence lowered to bottom position in order that the load may be removed therefrom by a suitable conveyor system.

Figure 1:
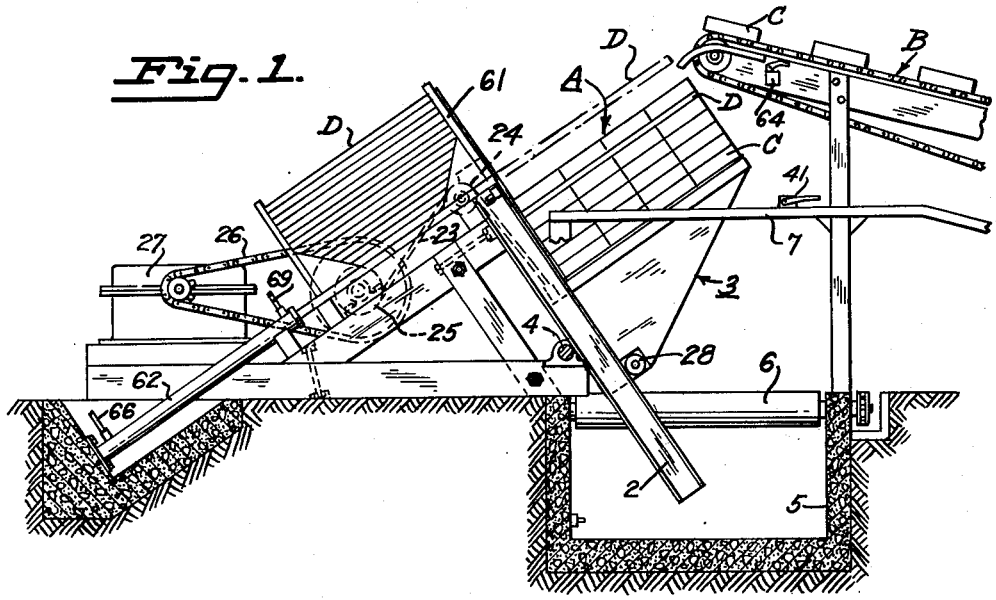
Fig. 1 is a side elevational view of a lumber reloader embodying my invention and wherein the foundation or pit portion thereof is shown in cross section and illustrating the reloader in tilted or reloading (loading) position.

Referring to the drawings, there is illustrated in Figs. 1 and 3 a lumber hoist comprising four aligned tiltable guide columns 2, each adapted to carry a hoisting arm 3 traversable longitudinally of a said guide column. It is obvious that any number of guide columns and associated hoisting arms may be utilized as long as there are two or more thereof.

As illustrated herein, the guide columns are mounted pivotally on a shaft 4 formed as a part of the assembly frame and which extends longitudinally above a pit 5, into which the bottom of the guide columns 2 extend. The pits are of sufficient depth that the lifting arms 3 may be disposed within the said pits below the level of a conveyor system, indicated herein as power driven rollers 6, adapted to carry off a load of lumber, illustrated generally at A, carried upon the lifting arms 3. When the lifting arms 3 descend far enough, the load is deposited on the rollers 6 and is thence transported away from the arms.

Conveyor belts or other suitable conveying mechanism are illustrated at B, which are adapted to deliver boards or timbers C to the reloader mechanism, comprising the tiltable columns and hoisting arms, at a point substantially above the conveyor system 6. Boards C, carried by the conveyor system B, are deposited upon the hoisting arms 3 by means of gravity when the columns are in tilted position, as indicated in Fig. 1, aided by guidance of an operator positioned on a platform, indicated at 7.

Means to limit the tilting of the columns and associated lifting arms may comprise a stop member 8, supported by a suitable frame 9 which extends longitudinally the length of the reloader assembly and which may be positioned at a predetermined angle of approximately 62° relative to the horizontal. It is sometimes desirable to change the angle of tilt of the guide columns, dependent upon the type of timbers or boards being handled. For this reason I prefer to provide a block 11, hinged to the bottom of stop 8 in alignment with each of the guide columns 2, so that the blocks 11 may be raised manually or by other suitable means to the position shown in dotted lines in Fig 2 to change the tilting angle of the columns 2 to an angle greater than 62° relative to the horizontal. Normally, the blocks 11 will be disposed in the position indicated in full lines in Fig. 2 by gravity. It is to be noted that each hoisting arm 3 comprises, preferably, a vertically disposed flat plate or web 12 and a normally horizontally disposed loading surface 13.

A guide column comprises two channel members 14, secured together by spacing members 15 and 16 which are secured to each of the channel members 14 in order to define a guide slot 21, into which extends the guideway-engaging portion 22 of the hoisting arm web 12. Chains or cables 23 are suitably attached to the track-engaging portion 22 of the hoisting arm 3 and are disposed within the guide columns over pulleys 24, carried by the guide columns adjacent to the tops thereof and are attached suitably to hoisting drums 25. The hoisting drums 25 are keyed to a rotatable shaft 10 which extends longitudinally of the reloader assembly. The shaft 10 and connected hoisting drums are adapted to be rotated through a chain drive or other suitable device 26, powered by a motor 27. Rollers 28 are usually carried adjacent to the bottom of hoisting arm webs 12 adapted to ride against the front part of guide column channels 14. I provide a limit switch, disposed between the channels 14 in guideway 21 of each of the guide columns adjacent to the top thereof, which is adapted to be contacted at the upper limit of the traverse of a hoisting arm in a guide column in order to stop the traverse of said hoisting arm in the event the operator is careless in operating the same.

Figure 4:
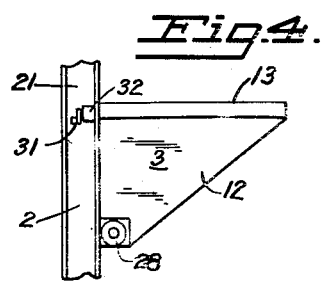
Fig. 4 is a fragmentary side elevational view of a hoisting member and guide column, showing the upper limit switch.

As illustrated in Fig. 4, a roller arm 31 is disposed within the guideway 21 and is connected, operatively, to a conventional limit switch 32, which in turn is operatively connected to the motor 27. Hence when the track-engaging portion 22 of hoisting arm 3 contacts the roller arm 31 at the upper limit of traversal thereof, the hoisting motor 27 is automatically stopped and damage to load and operator is avoided.

Figure 2:
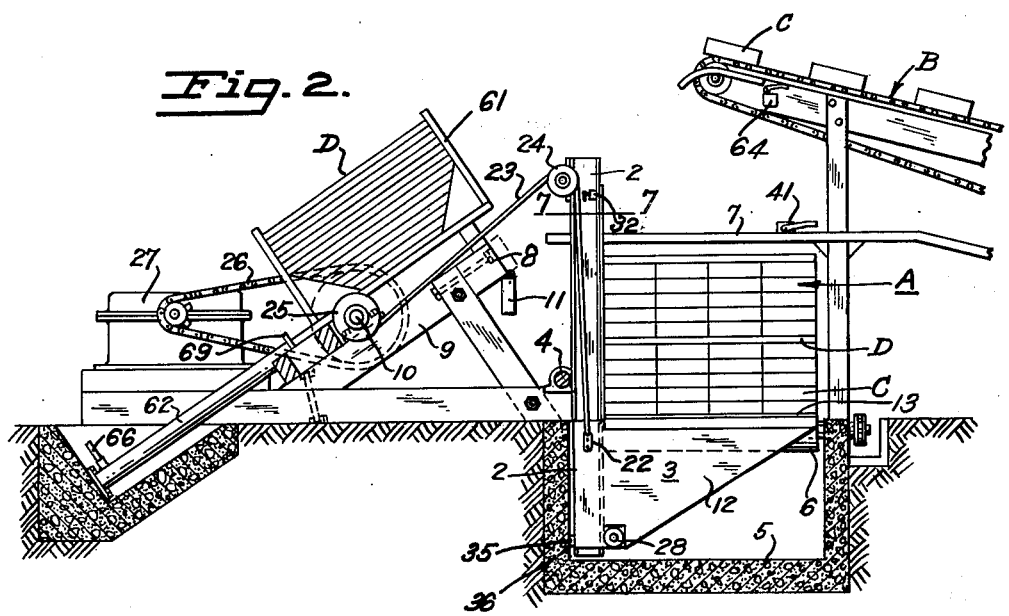
Fig. 2 is a similar view, showing the lumber reloader in fully loaded position and lowered to a point of load transfer.

Similarly, I provide a lower limit switch of conventional character, illustrated at 35, carried by a block 36 disposed within the pit 5 adjacent to the bottom thereof adapted to be contacted by a column when it assumes a vertical position, as illustrated in Fig. 2. The switch 35 opens the circuit to the motor 27, when it is contacted by a guide column 2, and thence the hoisting arms 3 can not be lowered after the said columns have been returned to vertical position. A foot-operated hoisting switch 41, connected operatively to the motor 27, is illustrated in Figs. 1 and 2 which is adapted to be operated by the attendant.

Figure 5:
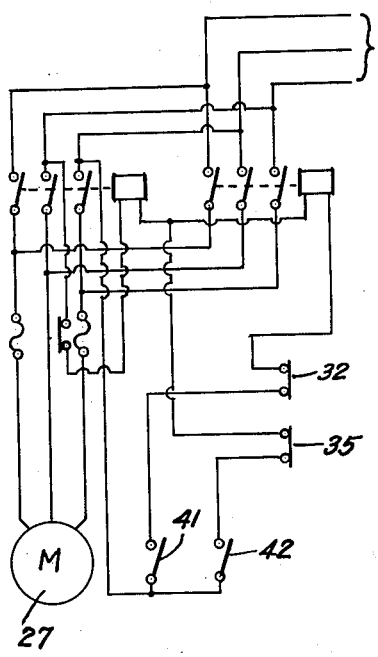
Fig. 5 is a diagrammatic view of the electric circuit controlling the elevation and lowering of the lumber reloader.

Fig. 5 illustrates a circuit diagram showing the various electrical connections between a suitable power source, hoisting motor, limit switches 32 and 35, and the hoisting switch 41. A lowering switch 42 (not shown in Figs. 1 and 2) may be conveniently located as a foot-operated switch is included in the circuit diagram of Fig. 5. The hoisting switch 41 is connected in series with the upper limit switch 32 and to a conventional relay arrangement which directly connects the power lines 47 to the motor 27. The lowering switch 42 is connected in series with the lower limit switch 35 and a conventional relay arangement which in turn connects the power lines to motor 27. Conventional switch means is provided to reverse the motor 27 to operate the said motor in opposite directions, dependent upon actuation of switch 41 or 42, as the case may be.

I also provide a means which enables the stacking of lumber on the hoisting arms 3 in a manner which provides a stable and balanced load. It is conventional practice in stacking lumber to insert between successive layers of the load a plurality of stickers which normally comprise laths or other similar type boards disposed transversely of the load.

As indicated in Figs. 1 and 2, stickers D are disposed between layers of boards composing a load transversely thereof. I provide a generally rectangular hopper 61, disposed substantially at the angle of tilt of the guide columns 2 when said columns are in reloading (loading) or elevated position, as indicated in Fig. 1. The hoppers 61 carry a quantity of stickers which are adapted to be ejected from the hopper transversely of the load in a manner which will now be described. Disposed behind the hopper 61 is a hydraulic or pneumatically operated cylinder 62, having a plunger 63 disposed slidably therein in registry with the open back of hopper 61. The plunger 63 is adapted to reciprocate relative to the cylinder 62 in order to force the bottommost sticker, contained within the hopper 61, outwardly therefrom, substantially as indicated in the dotted line showing of Fig. 1. The hoppers 61 and their associated sticker-ejecting mechanisms are disposed in spaced relation to one another longitudinally of the reloader assembly, substantially as indicated in Fig. 3.

It is to be noted that the plunger 63 is of a conventional double-acting character so that the said plunger may be reciprocated to eject a sticker from its associated hopper and then may be returned to position within the cylinder. Sometimes it is desirable to allow the plunger to remain in extended or ejecting position in order to hold a sticker in position relative to the load A in order to prevent the said sticker from sliding back toward the hopper. After the next adjacent layer of boards has been disposed atop the stickers, the said stickers adhere, through friction, to the load and then the plunger may be withdrawn into the cylinder. A control valve 64, which may be conveniently located adjacent to the station of the attendant entrusted with operation of the reloader assembly, is adapted to operate the several sticker-ejecting mechanisms in unison.

Figure 6:
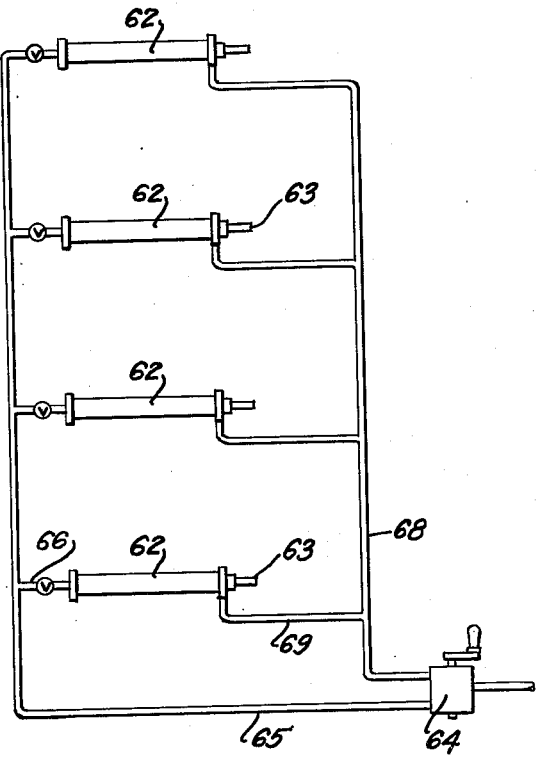
Fig. 6 is a circuit diagram of the pneumatic circuit adapted to control the sticker plunger.
Figure 7:
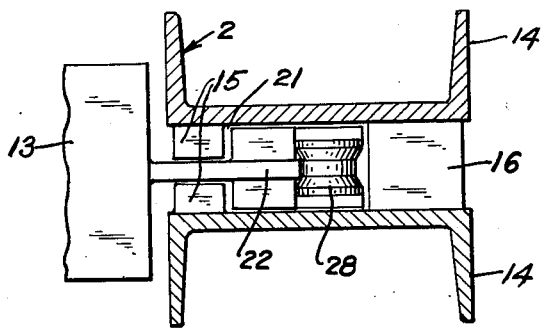
Fig. 7 is a fragmentary sectional view, taken on line 7—7 of Fig. 2.

A circuit diagram of the fluid control of said sticker-ejecting mechanisms is illustrated in Fig. 6. The control valve 64 may be operated manually to open fluid pressure in the lines 65 and 66 to cause forwarding of the plungers 63 and eject stickers and wherein the said valve 64 also may be manually operated selectively to open fluid pressure communication to lines 68 and 69 to cause retraction of said plungers.

In operation, the attendant operates the lifting switch 41, which causes the motor 27 to revolve shaft 10, which in turn causes the guide columns to be tilted about axis 4. After the columns have been tilted to the position defined by stop 8 the hoisting arms 3 traverse the columns 2 to an upper limit. Thence lumber C, carried by conveyor system B, is deposited upon the said hoisting arms 3 in successive layers as the operator inches the hoisting arms downwardly to accommodate the said layers of boards or timbers thereupon. As the load is progressively increased, the operator may eject stickers transversely of the layers of load, as herebefore described, by means of operation of fluid valve 64. After the load has reached a point wherein the hoisting arms have been lowered sufficiently, the center of gravity, defined by the pivotal axis of guide columns 2, causes the columns to tilt into vertical position, as indicated in Fig. 1, and thence the lumber or boards, comprising the load A, rests upon power-driven rollers 6 which carry the load from the reloading mechanism to a desired location within or without the lumber mill.

While I have described this invention in more or less specific detail for purposes of clarity of description by way of example and illustration, it is understood that various changes and modifications may be made in the reloader assembly and parts thereof within the spirit of the invention and the scope of the appended claims.

I claim:

1. Reloading apparatus comprising a tiltable hoist, means to tilt and to raise and lower the hoist, means to feed individual pieces of lumber and to stack them onto the hoist when in tilted and raised position, a container for stickers located adjacent to the hoist when said hoist is in tilted raised position, the container having a sticker outlet at the bottom thereof at the side adjacent to the hoist, a hydraulic cylinder having a piston rod projecting into the container at the bottom thereof at the side opposite the hoist, and means to actuate the projection and retraction of the piston rod.

2. Reloading apparatus comprising a tiltable hoist, means to tilt and to raise and lower the hoist, means to feed individual pieces of lumber and to stack them onto the hoist when in tilted and raised position, a container for stickers located adjacent to the hoist when said hoist is in tilted raised position, the container having a sticker outlet at the bottom thereof at the side adjacent to the hoist, a hydraulic cylinder having a piston rod projecting into the container at the bottom thereof at the side opposite the hoist, means to actuate the projection and retraction of the piston rod, a support for an operator adjacent to the feeding means and the uppermost position of the hoist, and control means for lowering the hoist and control means for the hydraulic cylinder both within easy reach of an operator on the support.

3. Reloading apparatus comprising tiltable, upwardly extending members, arms projecting laterally from the members and spaced laterally from each other, means to tilt the members and raise and lower the arms, a conveyer having a discharge end above the outer ends of the arms when in up and tilted position, a platform to support an operator adjacent to the outer ends when in such position, a container for stickers adjacent to the upwardly extending members when in tilted position, the container having a sticker outlet at the bottom of the side adjacent to the upwardly extending members, pusher means to force stickers through the outlet onto the load on the arms comprising hydraulic cylinders having piston rods extending into the container through the opposite side thereof, means for periodically controlling the lowering of the arms, control means for actuating the hydraulic cylinders in unison, means for controlling the raising of the arms, all such control means being within easy reach of an operator on the platform, and conveyer rollers which, when the upwardly extending members are in untilted normal position and the arms are in lowermost position, are adjacent to the arms with their upper surfaces above those of the arms.

4. Reloading apparatus comprising a hoist having load receiving arms, means to tilt and raise and lower said hoist, means to transport pieces of lumber and to stack them on said hoist arms when in raised and tilted position, means to position stickers on the partially formed stack, said last named means comprising a container for stickers positioned near the locus of formation of the stack and wherein the lowermost stickers in said container are disposed slightly above the topmost layer of said lumber stack and at approximately the same degree of angularity relative to the horizontal as said lumber stack, and mechanism for ejecting stickers from said container transversely of the formation of said load.

5. Reloading apparatus comprising a tiltable hoist having spaced load-receiving arms, means to tilt and to raise and lower the hoist, means comprising a conveyer having a discharge end located above and to one side of the uppermost ends of said raised and tilted arms to feed indiviual pieces of lumber thereon by gravity and to stack said pieces side by side in layer formation to form a load, a container for stickers located adjacent to the hoist when said hoist is in tilted raised position, mechanical transfer means to remove stickers from the container and to position them transversely of layers of lumber carried by the arms, and control means to operate said mechanical transfer means.

6. Reloading apparatus comprising a tiltable hoist having spaced load-receiving arms, means to tilt and to raise and lower the hoist arms, means comprising a first conveyer having a discharge end located above and to one side of the uppermost ends of said raised and tilted arms to feed material thereon by gravity in layer formation to form a load thereon, second conveyer means disposed directly below the load carried by said arms when in tilted and raised position, said second conveyer means arranged to receive said load automatically from the arms as the arms approach their lowermost position, and means to prevent movement of the arms beyond predetermined limits.

7. Reloading apparatus comprising a hoist having spaced load-receiving arms, means to tilt and to raise and lower said arms, means to transport individual pieces of lumber and to stack them on said hoist arms in layer formation when in raised and tilted position, means to position stickers on the partially formed stack, said last named means comprising a container for stickers positioned near the locus of formation of the stack, power operated mechanism for ejecting stickers from said container and positioning them transversely of the formation of said load, and manually operable control means for actuating said power operated mechanism.

8. Reloading apparatus comprising a tiltable hoist having spaced load-receiving arms, means to tilt and to raise and lower the hoist, means comprising a first conveyer having a discharge end located above and to one side of the uppermost ends of said raised and tilted arms to feed material thereon by gravity in layer formation to form a load thereon, and second conveyer means comprising rollers disposed parallel to said arms and directly below the hoist, said rollers having their upper load-receiving surfaces disposed above the hoist arms when the hoist is in down and untilted position.

JESSE J. TALLMAN.

REFERENCES CITED

The following references are of record in the file of this patent:

UNITED STATES PATENTS

| Number | Name | Date |
|---|---|---|
| 523,609 | Wadley | July 24, 1894 |
| 674,262 | Duncan | May 14, 1909 |
| 944,946 | Clark | Dec. 28, 1909 |
| 1,128,671 | Evans | Feb. 16, 1915 |
| 1,935,783 | Roemer | Nov. 21, 1933 |
| 2,005,906 | Pierce | June 25, 1935 |
| 2,065,674 | Fay | Dec. 29, 1936 |
| 2,228,887 | Peterson | Jan. 14, 1941 |
| 2,317,000 | Tallman | Apr. 20, 1943 |
| 2,372,647 | Beane | Apr. 3, 1945 |